United States Patent
Costello et al.

(10) Patent No.: US 12,348,576 B2
(45) Date of Patent: *Jul. 1, 2025

(54) PRIVACY CONTROL FOR MEETING RECORDINGS

(71) Applicant: Cisco Technology, Inc., San Jose, CA (US)

(72) Inventors: John Costello, Claregalway (IE); Robert Patrick Headon, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,078

(22) Filed: Nov. 30, 2023

(65) Prior Publication Data

US 2024/0121283 A1    Apr. 11, 2024

Related U.S. Application Data

(63) Continuation of application No. 17/963,575, filed on Oct. 11, 2022, now Pat. No. 11,916,985.

(51) Int. Cl.
*H04L 65/4038* (2022.01)
*H04L 12/18* (2006.01)

(52) U.S. Cl.
CPC ...... *H04L 65/4038* (2013.01); *H04L 12/1831* (2013.01)

(58) Field of Classification Search
None
See application file for complete search history.

(56) References Cited

U.S. PATENT DOCUMENTS

| 7,945,622 B1* | 5/2011 | Pegg | G06Q 10/10 |
| | | | 709/204 |
| 2002/0154210 A1* | 10/2002 | Ludwig | H04M 3/562 |
| | | | 348/E7.083 |

(Continued)

FOREIGN PATENT DOCUMENTS

| WO | 2022125341 A1 | 6/2022 | |
| WO | WO-2023022774 A1 * | 2/2023 | ........... G06F 3/0482 |

OTHER PUBLICATIONS

"Audio Transcription for Cloud Recordings," Zoom Support, https://support.zoom.us/hc/en-us/articles/115004794983, Last updated Oct. 7, 2022, 14 Pages.

(Continued)

*Primary Examiner* — Phyllis A Book
(74) *Attorney, Agent, or Firm* — Edell, Shapiro & Finnan, LLC

(57) ABSTRACT

Methods are provided in which a recording service obtains a multimedia stream along with metadata of an established collaboration session in which at least two participants collaborate via respective user devices. The recording service identifies each of the at least two participants of the established collaboration session based on the metadata and obtains an individual recording privacy control associated with each of the at least two participants based on identifying. The recording service further generates a recording of the established collaboration session restricted by the individual recording privacy control for each of the at least two participants.

20 Claims, 8 Drawing Sheets

(56) References Cited

U.S. PATENT DOCUMENTS

| | | | | |
|---|---|---|---|---|
| 2004/0143630 | A1* | 7/2004 | Kaufmann | G09B 7/02 709/224 |
| 2004/0252185 | A1* | 12/2004 | Vernon | H04L 65/403 348/E7.083 |
| 2005/0254440 | A1* | 11/2005 | Sorrell | H04L 65/1101 348/14.08 |
| 2009/0148124 | A1 | 6/2009 | Athsani et al. | |
| 2009/0300520 | A1* | 12/2009 | Ashutosh | H04L 12/1831 715/756 |
| 2009/0319916 | A1* | 12/2009 | Gudipaty | H04N 7/15 715/753 |
| 2010/0189260 | A1 | 7/2010 | Ramanathan et al. | |
| 2013/0007635 | A1* | 1/2013 | Michaelis | H04M 3/56 715/753 |
| 2013/0063542 | A1* | 3/2013 | Bhat | H04L 12/1822 348/E7.083 |
| 2013/0145284 | A1 | 6/2013 | Anantharaman et al. | |
| 2014/0033073 | A1 | 1/2014 | Pegg | |
| 2014/0152757 | A1 | 6/2014 | Malegaonkar et al. | |
| 2014/0267571 | A1* | 9/2014 | Periyannan | H04L 12/1827 348/14.08 |
| 2016/0269449 | A1 | 9/2016 | Modai et al. | |
| 2017/0010760 | A1 | 1/2017 | Rapport et al. | |
| 2017/0310826 | A1* | 10/2017 | Gunasekar | G06Q 10/1095 |
| 2019/0268387 | A1 | 8/2019 | Pelton et al. | |
| 2021/0185276 | A1* | 6/2021 | Peters | G06V 20/41 |
| 2022/0109707 | A1* | 4/2022 | Butterfield | G06Q 10/103 |
| 2022/0182428 | A1* | 6/2022 | Roedel | G06Q 10/063114 |
| 2022/0239655 | A1* | 7/2022 | Viswanathan | H04L 63/105 |
| 2022/0247587 | A1 | 8/2022 | Rolin et al. | |
| 2022/0247588 | A1 | 8/2022 | Ittelson | |
| 2022/0294799 | A1* | 9/2022 | Madaan | G06F 16/2379 |
| 2022/0294800 | A1* | 9/2022 | Madaan | H04L 12/1822 |
| 2023/0030976 | A1* | 2/2023 | Kalinichenko | H04L 65/403 |
| 2023/0032159 | A1* | 2/2023 | Kalinichenko | H04L 12/1831 |
| 2023/0083581 | A1 | 3/2023 | Beckmann et al. | |
| 2023/0083688 | A1 | 3/2023 | Janakiraman et al. | |
| 2024/0106873 | A1* | 3/2024 | Dushman | H04L 65/4015 |

OTHER PUBLICATIONS

"Customizing your Profile," Zoom Support, https://support.zoom.us/hc/en-us/articles/201363203, Last updated Sep. 27, 2022, 15 Pages.

"Managing and Sharing Cloud Recordings," Zoom Support, https://support.zoom.us/hc/en-us/articles/205347605-Managing-and-sharing-cloud-recordings, Last updated Sep. 22, 2022, 17 Pages.

"Meeting Registration and Polling Reports," Zoom Support, https://support.zoom.us/hc/en-us/articles/216378603, Last updated Jan. 31, 2022, 15 Pages.

* cited by examiner

PRIVACY CONTROL FOR MEETING RECORDINGS

CROSS-REFERENCE TO RELATED APPLICATIONS

This application is a continuation of U.S. patent application Ser. No. 17/963,575, filed Oct. 11, 2022, which is incorporated herein by reference in its entirety.

TECHNICAL FIELD

The present disclosure generally relates to online meeting space environments.

BACKGROUND

Virtual meeting space environments and video conferencing are popular. Video conferencing typically involves a group of geographically remote participants joining an online meeting via respective user devices for collaboration and content sharing. During video conferencing, video streams of participants are displayed in windows in substantially real-time. That is, meetings consist of audio and video streams. Sometimes, audio and video streams are recorded and archived for replays and/or machine analysis. Meetings have further evolved to include various playback artifacts such as transcripts, gestures, reactions, polls, question and answer section, location, screen sharing, whiteboards, etc. These playback artifacts may also become part of the recording.

DETAILED DESCRIPTION

Overview

Figure 1:
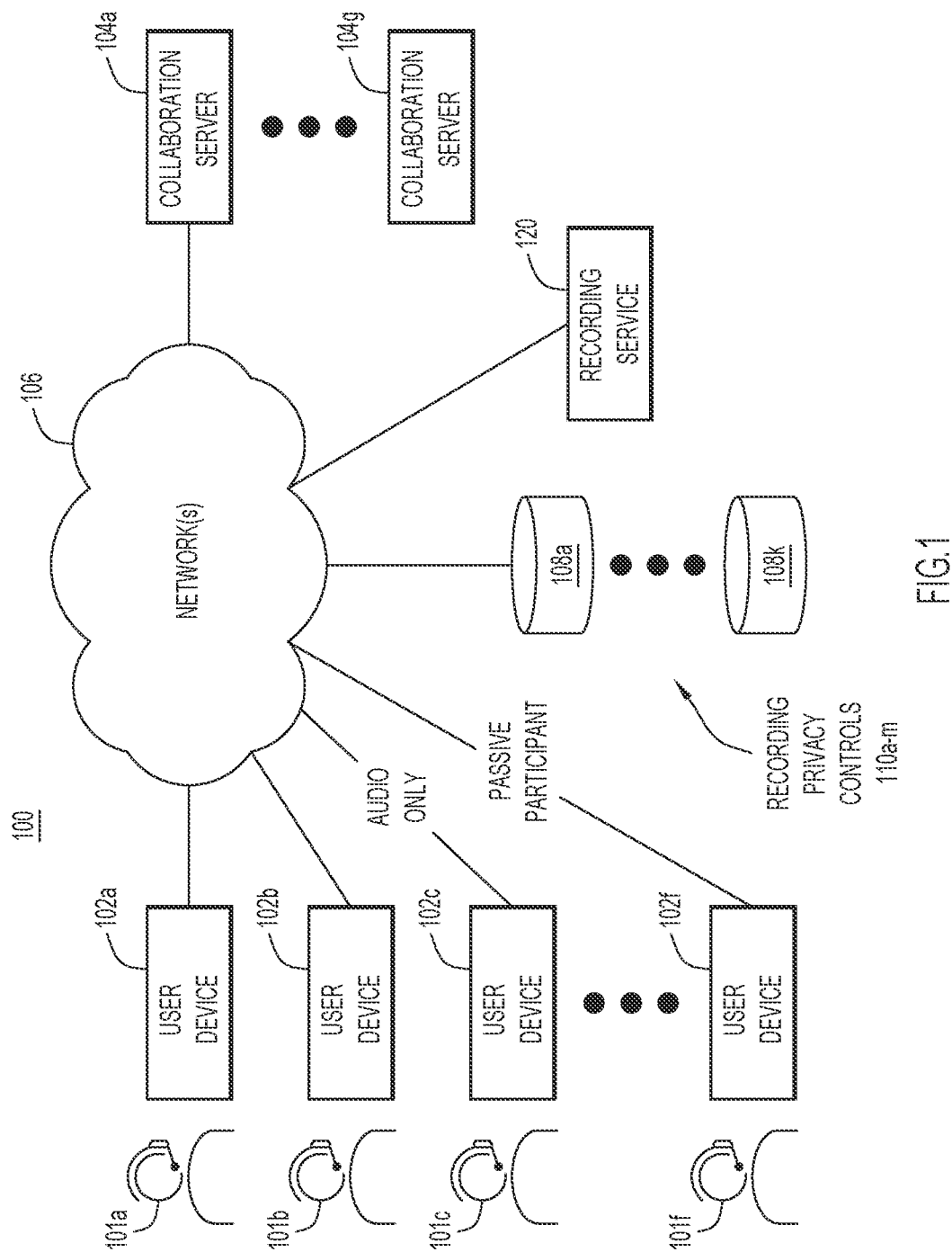
FIG. 1 is a block diagram illustrating a system for generating a recording of an established collaboration session among a plurality of participants, restricted by one or more recording privacy controls, according to an example embodiment.

Techniques presented herein provide privacy control for recording collaboration sessions and/or online meetings. The techniques enhance privacy controls in collaboration session recordings by excluding or removing occurrences of unwanted and/or inappropriate activities, events, content and/or by applying individual recording privacy controls associated with one or more participants of the collaboration session.

In one form, a recording service obtains a multimedia stream along with metadata of an established collaboration session in which at least two participants collaborate via respective user devices. The recording service identifies each of the at least two participants of the established collaboration session based on the metadata and obtains an individual recording privacy control associated with each of the at least two participants based on identifying. The recording service also generates a recording of the established collaboration session restricted by the individual recording privacy control for each of the at least two participants.

In another form, a recording service obtains a multimedia stream along with metadata of an established collaboration session in which at least two participants collaborate via respective user devices. The recording service detects, in the multimedia stream, one or more occurrences of a private or unwanted action of a participant of the at least two participants in the established collaboration session and generates a recording of the established collaboration session in which the one or more occurrences of the private or unwanted action is excluded.

Example Embodiments

In an online meeting space environment, participants and/or users (these terms are used interchangeably throughout the description) are participating via their respective devices that may be geographically remote from each other. The participants and/or users include humans, bots, and/or other non-human entities such as automated computer systems.

The participant and the respective user (client) device, such as a computer, laptop, tablet, smart phone, etc., may collectively be referred to as endpoints or user devices. The user devices may communicate with each other via one or more networks such as the Internet, virtual private network (VPN), and so on.

The user devices typically have interactive connectivity in a collaboration session. Interactions may include, but are not limited to, manipulating a user interface screen to jump to a particular location, zooming, making changes to the actual items and/or objects being displayed such as adding, deleting, and/or editing items and/or objects on the user interface screen, etc.

A collaboration session or an online video conference or an online meeting (these terms are also used interchangeably throughout the description) typically involves two or more participants being connected via their respective user devices in real-time for collaboration. During a collaboration session, the participants are displayed in their respective windows. The audio and/or video of the participants are provided in substantially real-time. The collaboration sessions have evolved to further include many artefacts (referred to as "metadata") such as transcripts, gestures, reactions, polls, question and answer sections, location, chats, voting, screen sharing, whiteboards, etc. For example, a canvas or a whiteboard may be provided during the collaboration session for content sharing and co-editing.

The collaboration session may be recorded and archived for replays and/or machine analysis. The recording (sometimes referred to interchangeably as a "meeting recording" or a "collaboration session recording") typically include video stream, audio stream, and the artefacts of the collaboration session. However, collaboration sessions may be hosted by an external organization where data policies for the user's enterprise do not apply, or the collaboration sessions may be recorded in geographic regions with different data privacy rules to those familiar to the user in the user's local region. From this combination of sources of information, including video and audio, and information and signals derived from these sources, significant personal and behavior information becomes available for analysis. This information may be misused if acquired by wrongdoers. Privacy controls for collaboration session recordings are needed.

Some privacy controls may include muting the audio during the live collaboration session or turning the video/camera off during the live collaboration session. These privacy controls, however, hinder the actual live experience during the collaboration session itself.

Some other privacy controls may include manipulating settings for the collaboration session recordings before the collaboration session. These settings may include splitting the recording streams i.e., allowing the meeting host to dictate who has access to which collaboration session recordings and in what format. For example, the host may set the sharing of the recording for internal users only (within the enterprise) or for public (anyone may view the recording). As another example, the host may add an expiration date i.e., recording is available until a certain date and time. The host may further set whether the recording may be downloaded or only viewed online and whether an audio transcript is to be generated and available. The host may further require authorizations (such as name, email, and/or password) to view the recording and may control, to some degree, further sharing and/or copying of the meeting recording. Additionally, some privacy control settings may allow the host to conceal or reveal key artefacts of the collaboration session (metadata) such as participants names, audio transcripts, video stream, thumbnail of the presenter, and panelists chat.

However, the above privacy controls are limited to the settings placed by the host before the meeting occurs i.e., before establishing the collaboration session. Other participants of the collaboration session have no control over what is being recorded. Further, these privacy controls are "always on" or "always off" and "show in full" or "do not show at all". In other words, these privacy controls do not allow for in-meeting control (changing the settings during the collaboration session or for a portion thereof) nor do these privacy controls offer the flexibility to include or exclude multiple modalities and/or granularities for the meeting recordings, for example after the meeting is terminated. In other words, granular privacy controls specific to meeting recordings are required.

Techniques presented herein provide granular and/or modular privacy controls for collaboration session recordings. The techniques enhance privacy controls for the collaboration session recordings by removing unwanted content (audio, video, one or more artefacts/metadata) from the recording per participant using privacy control policies, in-meeting commands, and/or post-meeting filtering. The recording privacy controls do not interfere with the live collaboration session experience and allow each participant to set their own level of fidelity specific for the recording of the collaboration session.

FIG. 1 is a block diagram illustrating a system 100 for generating a recording of an established collaboration session among a plurality of participants, restricted by one or more recording privacy controls, according to an example embodiment. The system 100 includes a plurality of participants 101a-f, a plurality of user devices (devices) 102a-f, a plurality of collaboration servers 104a-g, a network (or a collection of networks) 106, one or more databases 108a-k that store recording privacy controls 110a-m, and a recording service 120.

The notations "a-f", "a-g", "a-k", "a-m", "a-n", "a-q", "a-p", "a-r", "a-s", "a-t" and the like denote that a number is not limited, can vary widely, depends on a particular use case scenario, and need not be the same, in number. Moreover, this is only examples of various collaboration sessions, and the number and types of sessions and collaboration session recordings may vary based on a particular deployment and use case scenario.

In the system 100, one or more users/participants may be participating in a collaboration session (depicted as a first participant 101a, a second participant 101b, a third participant 101c, and a fourth participant 101f). Each participant may be associated with one or more recording privacy controls 110a-m. For example, the first participant 101a may be associated with a recording privacy policy of an enterprise (a first recording privacy control) and/or one or more individual recording privacy controls. The individual recording privacy controls may vary depending on a type of a collaboration session (e.g., external vs. internal), as described in further detail below. Each participant may set respective recording privacy controls before connecting to a collaboration session (using the recording privacy controls 110a-m stored in the databases 108a-k), during the established collaboration session (by using in-meeting commands), and/or after the established collaboration session (by setting post-meeting filters). The participants 101a-f use their respective devices 102a-f (depicted as a first endpoint device 102a, a second endpoint device 102b, a third endpoint device 102c, and a fourth endpoint device 102f) to participate in a collaboration session.

The collaboration servers 104a-g and the devices 102a-f communicate with each other via the network 106. The network 106 may include a local area network (LAN), a wide area network (WAN) such as the Internet, or a combination thereof, and includes wired, wireless, or fiber optic connections. In general, the network 106 can use any combination of connections and protocols that support communications between the entities of the system 100.

The collaboration servers 104a-g (depicted as a first collaboration server 104a and a second collaboration server 104g) manage and control collaboration sessions. The devices 102a-f communicate with the collaboration servers 104a-g to join and participate in the collaboration session. The collaboration servers 104a-g retrieve and control distribution of various content from the databases 108a-k and media stream of the collaboration session to the devices 102a-f.

The collaboration servers 104*a*-*g* further store identifiers of various collaboration sessions that may be obtained from the databases 108*a*-*k* (one or more memories or datastores), depicted as a first database 108*a* and a second database 108*k*. The collaboration servers 104*a*-*g* are configured to communicate with various client applications executing on the devices 102*a*-*f*. The client applications running on the devices 102*a*-*f* detect various actions performed by the respective participants during a collaboration session and notify the respective collaboration server associated with the collaboration session about these events. The respective collaboration server may render or display, in a collaboration space and/or on a user interface screen of the respective device, one or more contents of the collaboration session. That is, one of the collaboration servers 104*a*-*g* sends commands to the client applications running on the devices 102*a*-*f* to render content in a particular way, to change views, controls, and so on. In short, the collaboration servers 104*a*-*g* control the collaboration sessions by communicating and/or interacting with client applications running on the devices 102*a*-*f* that detect various actions performed by the participants 101*a*-*f* during the collaboration sessions and execute commands and/or instructions for the collaboration sessions as provided by the collaboration servers 104*a*-*g*.

In one or more example embodiments, the collaboration servers 104*a*-*g* further communicate with the recording service 120 via the network 106. The collaboration servers 104*a*-*g* provide, to the recording service 120, various data such as multimedia stream of an ongoing collaboration session (video steam and/or audio stream) and the artefacts (metadata). The collaboration servers 104*a*-*g* further monitor activities occurring in collaboration sessions such as in-meeting commands from one or more participants 101*a*-*f* via respective devices 102*a*-*f* and adjust the ongoing collaboration sessions accordingly. For example, if a command involves the collaboration session recording or a setting for the collaboration session recording, the collaboration servers 104*a*-*g* provide the command to the recording service 120. In yet another example embodiment, the recording service 120 may directly communicate with the client applications running on the devices 102*a*-*f* via the network 106 to obtain the multimedia stream and metadata of the ongoing collaboration session and/or any in-meeting commands intended for the recording service 120 such as start or stop recording, adjust settings for the recording, change fidelity level, etc.

The recording service 120 generates one or more recordings of an ongoing collaboration session. Specifically, the recording service 120 identifies each of the participants 101*a*-*f* of the established collaboration session using login identifier, client identifier, or a device identifier, etc. The recording service 120 then obtains, from the databases 108*a*-*k*, recording privacy controls 110*a*-*m* associated with each of the identified participants 101*a*-*f* and generates one or more recordings of the established collaboration session that are restricted by the obtained recording privacy controls 110*a*-*m*.

For example, one or more artefacts, video, and/or audio of the first participant 101*a* may be omitted from the generated recording based on a first individual recording privacy control associated with the first participant 101*a*, while a video stream of the second participant 101*b* is included in the recording but the audio of the second participant 101*b* is excluded based on a second individual recording privacy control associated with the second participant 101*b*, while video stream and audio steam of the third participant 101*c* is included in the recording based on a third individual recording privacy control associated with the third participant 101*c*. That is, the recording service 120 applies the individual recording privacy control of the participant to the respective portion of the multimedia stream and metadata generated by this participant. The generated recording thus has various recording privacy controls 110*a*-*m* applied to various portions of the multimedia stream and artifacts/metadata. Each participant is in control of his or her multimedia stream and/or artefacts for the recording.

As another example, the recording service 120 may generate multiple recordings of the established collaboration session such as the first recording that is restricted by a first recording privacy control associated with the first participant 101*a* (e.g., exclude video stream), the second recording that is restricted by a second recording privacy control associated with the second participant 101*b* (e.g., no transcript), and the third recording is restricted by a third recording privacy control associated with the third participant 101*c* (e.g., no backgrounds in the video stream and no artefacts).

The recording service 120 may further detect one or more occurrences of a private or unwanted action of the participants 101*a*-*f* and omits these detected occurrences from the recording of the established collaboration session. For example, the recording service 120 may blur one of the participants 101*a*-*f* in the video stream while this participant is scratching their face or is looking away from the camera. The private or unwanted actions may be defined in the recording privacy controls 110*a*-*m* stored in the databases 108*a*-*k*. A default set of private or unwanted actions may be defined in the recording privacy controls 110*a*-*m* such as scratching, touching, coughing, etc. The private or unwanted actions may also be defined by an enterprise and/or individual participants. For example, a participant may define additional unwanted actions such as twirling their hair, touching their mustache, stroking their beard, playing with a pen or a stress ball in their hand, etc.

In one or more example embodiments, the recording privacy controls 110*a*-*m* involves defining a fidelity level for the collaboration session recording, which is then applied by the recording service 120 when generating the recording. The recording privacy controls 110*a*-*m* are specific to the recordings and do not impact the live on-going collaboration session. The fidelity level may be specified by an end user (one of the participants 101*a*-*f*), by an administrator, by an enterprise at a group or individual levels, and/or by a collaboration platform (service provider). The administrator may control user's ability to set degrees or levels of fidelity. The levels of fidelity may be specified in a policy file and stored in the databases 108*a*-*k*. The recording service 120 then obtains a policy file for each identified participant of the established collaboration session that has one defined. The recording service 120 will not persist information that the user has opted out of, during live recording, and post processing of the recording.

In one example embodiment, the levels of fidelity may include but not limited to (1) a first fidelity level in which at least an audio and a video of the respective participant are excluded from the recording of the established collaboration session, (2) a second fidelity level in which a video is excluded from the recording of the established collaboration session, and (3) a third fidelity level in which at least a portion of a background in the multimedia stream of the respective participant is excluded from the recording of the established collaboration session.

In yet another example embodiment, the levels of fidelity may include but not limited to:

(1) An incognito level of fidelity. When the incognito fidelity level is set, any record of the respective participant is removed from the recording. In other words, the recording service 120 excludes all data associated with the respective participant in the established collaboration session when generating the recording. The data may include but is not limited any record of this participant such as attendance, participation, content shared, audio, video, other artefacts. In one example embodiment, the recording service 120 may exclude the media stream and all metadata of the respective participant from the recording. In yet another example embodiment, the recording service 120 may blur the media stream and all metadata of the respective participant from the recording.

(2) An attendance level of fidelity. When the attendance fidelity level is set, the recording service 120 only includes information about the presence of the respective participant in the established collaboration session. For example, the recording service 120 may include the name and general information of the respective participant (contact information, title, etc.) in the recording. The recording service 120 excludes or omits audio and video of the respective participant and all artefacts of the respective participant (such as participation actions, texts, etc.) from the recording of the established collaboration session. In yet another example embodiment, the recording service 120 may blur the video of the respective participant and all artefacts of the respective participant.

(3) A participation level of fidelity. When the participation fidelity level is set, the recording service 120 only includes artifacts or metadata of the respective participant (meeting actions) such as texts, posts, participation actions, content shared, edits made on the whiteboard, etc. When the participation fidelity level is set, the recording service 120 excludes or blurs audio and video of the respective participant from the recording of the established collaboration session.

(4) An audio level of fidelity. When the audio fidelity level is set, the recording service 120 excludes the video of the respective participant when generating the recording of the established collaboration session while audio and meeting actions (text, participation actions, etc.) are included in the recording of the established collaboration session.

(5) A background level of fidelity. When the background fidelity level is set, the recording service 120 excludes or blurs the background of the respective participant window from the recording of the established collaboration session.

(6) A full level of fidelity. When the full fidelity level is set, the recording service 120 records all modality and context of the respective participant (video, audio, metadata) of the established collaboration session.

These are just some non-limiting examples of various fidelity levels. The fidelity levels may depend on a type of deployment and use case scenario. The fidelity levels are defined based on information that may be identified and extracted from the multimedia stream and metadata of the established collaboration session such as audio, video, text, meeting actions (polls, chats, gestures, reactions, voting), content shares (screen, whiteboard), etc. For example, no-share fidelity level may permit recording multimedia stream and artefacts of the respective participant but not the content shared by the respective participant (such as the screen or whiteboard). The screen, whiteboard, or other content shared is excluded or blurred from the recording (depending on a replacement action specified in the recording privacy controls 110*a-m*).

The fidelity levels are set in the privacy recording controls 110*a-m* stored in the databases 108*a-k*. The fidelity levels may be selected in advance of the joining a collaboration session, during the established collaboration session (e.g., in-meeting commands), and/or after the termination of the collaboration session (e.g., post meeting through filtering).

The privacy recording controls 110*a-m* may include one or more replacement actions such as blurring, excluding, replacing with a virtual component. If no replacement action is defined, the recording service 120 may apply a default replacement action of blurring for example.

In one or more example embodiments, advance recording privacy control policies may be applied to information available in the multimedia stream and metadata of an established collaboration session. For example, the policy may define the following for the recording service 120:

(1) For a video stream of an established collaboration session, perform the following actions:

A. apply a virtual/privacy background to the meeting recording, using established methods, while true background is being shared during the established collaboration session.

B. remove unwanted actions such as hand and arm gestures, signs, and facial actions such as scratching and picking, raising eyebrows, etc.

C. remove sensitive material (e.g., blur computer screens, whiteboards, participant window, etc.).

D. remove facial expressions, as determined by computer vision e.g., when the participant is appearing surprised or angry.

E. allow recording only when the participant is an active speaker.

F. remove unwanted behavior such as coughing, sneezing, etc. by pausing the recording of the video stream during these behaviors. In other words, these unwanted behaviors are omitted from the recording of the collaboration session.

G. record only while the participant is focused on the collaboration session. For example, pause or exclude periods in the established collaboration session when attention of the participant is interrupted and is away from the collaboration session such as, when the participant is picking up an unrelated call, having an unrelated conversation, turns away from the user device, etc.

(2) For an audio stream of an established collaboration session, perform the following actions (using transcripts and natural language processing, for example):

A. exclude from the audio portion of the recording of an established collaboration session language that is inappropriate such as swearing, cursing, etc.

B. remove background noise(s) such as unrelated discussions, sneezes, coughs, etc.

C. exclude from the audio portion of the recording of the established collaboration session, audio affect such as expressions of anger, tutting, sighs, muttering, etc.

D. exclude from the audio portion of the recording of the established collaboration session, banter, inappropriate discussions, etc.

E. exclude from the audio portion of the recording of the established collaboration session, confidential, off the record and in confidence discussions, based on keywords and/or trigger terms.

These advanced recording privacy control policies may be stored in the databases 108*a-k* and applied by the recording service 120 as default recording privacy control policies. In other words, the recording service 120 detects occurrences of private or unwanted actions in the established collaboration session and excludes these occurrences from the recording. The recording service 120 may apply this default policy to each of the participants of the collaboration session or to only some of the participants of the collaboration session depending on the settings.

Additionally, the recording service 120 and/or the collaboration servers 104*a-g* generate a meeting recording indicator that indicates the fidelity level and/or policy information (e.g., in the tooltip) for each of the participants of the established collaboration session. That way, each participant knows what is going to be recorded and what items will be excluded from the recording. Additionally, the recording service 120 adds, to the recording, one or more indicators that specify the fidelity level and/or policy information.

As noted above, the participants 101*a-f* may further specify privacy recording controls 110*a-m* via a recording privacy control policy. For example, a user may configure different recording profiles per collaboration session type e.g., as a meeting template, private meeting, internal enterprise meeting, client meeting, external meeting, etc. An enterprise may also set enterprise default privacy recording controls. Additionally, the participants 101*a-f* may perform temporary modifications to the recording policy being applied during the established collaboration session. For example, a user may perform an action to pause all recording of their media using in-band or in-meeting commands. The user may render the in-meeting command using one or more gestures, voice, etc. Yet in another example, the participant may use trigger words (defined using a collaboration session tool) such as "Off the Record"/"Confidentially". This is particularly useful when a majority of the collaboration session is for the public/wider consumption and only small portions of the collaboration session are for the participants 101*a-f* alone during the established collaboration session.

Figure 3:
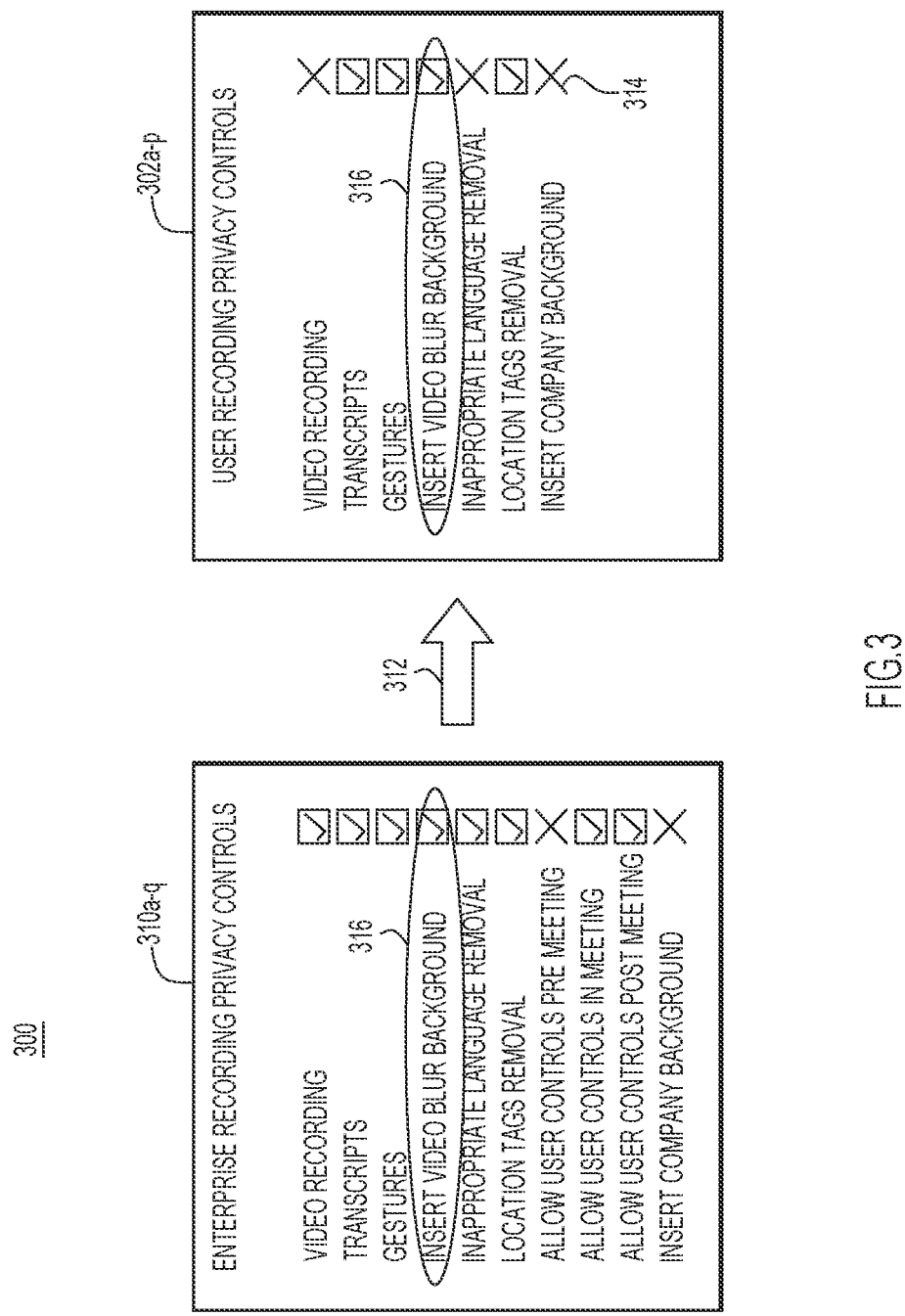
FIG. 3 is a view illustrating a user interface having user recording privacy controls being a user-initiated recording privacy policy limited by a recording privacy policy of an enterprise, according to an example embodiment.

In one or more example embodiments, the enterprise may have a set of privacy levels that automatically trigger the disablement/removal of any of the above, detailed in FIG. 3. If the recording service 120 cannot support the recording privacy control policy, no information should be recorded that would allow this information to be derived from the established collaboration session. For example, if a check for swear words cannot be applied, the audio stream must not be recorded.

Additionally, post meeting filtering may be applied. For example, the participant may interact with the recording service 120 after the collaboration session is terminated, to specify additional preferences (privacy recording controls 110*a-m*) that are to be applied to previous recordings.

Figure 2:
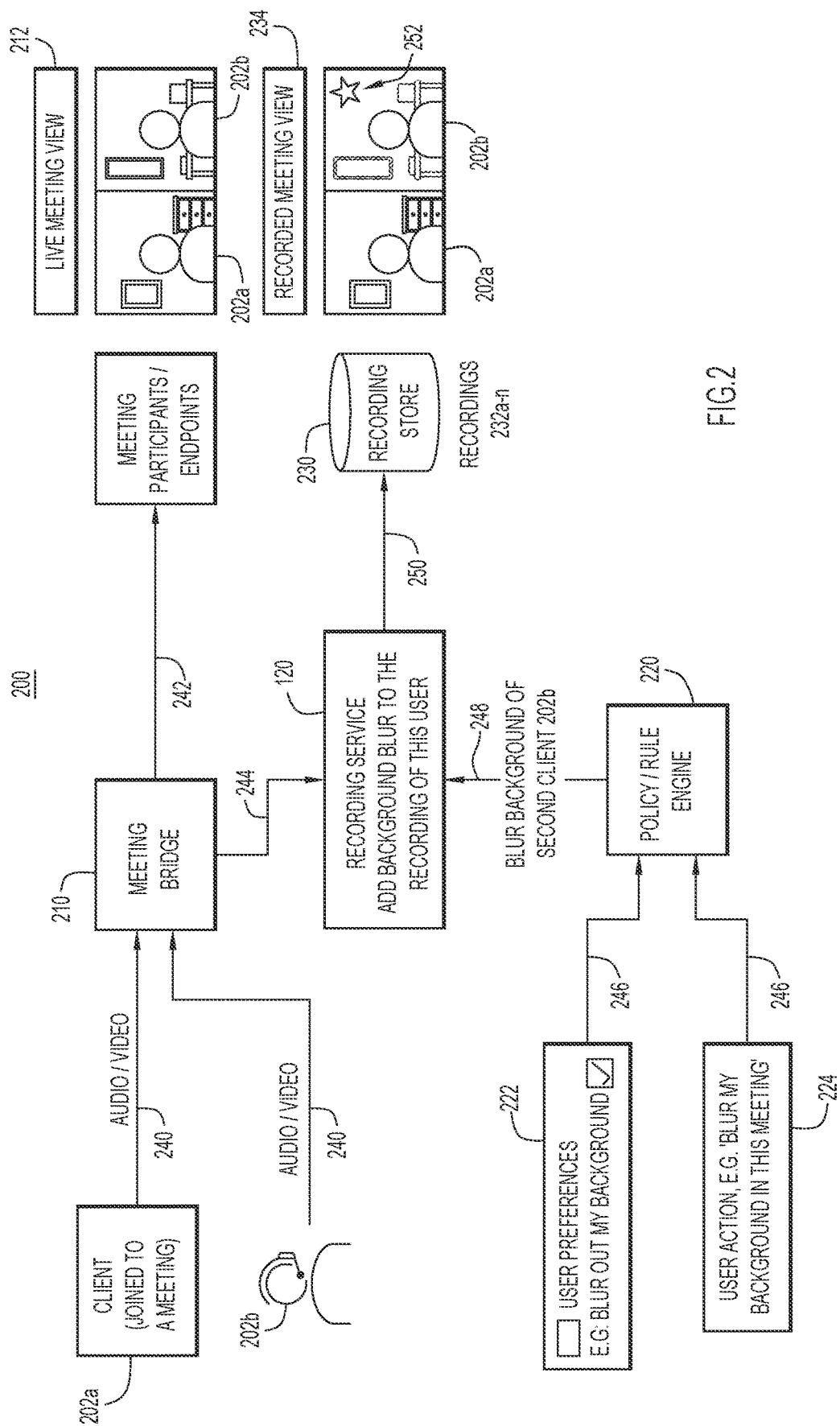
FIG. 2 is a block diagram illustrating a system for generating a recording of an established collaboration session in which a background is blurred according to individual privacy recording controls, according to one or more example embodiments.

FIG. 2 is a block diagram illustrating a system 200 configured to generate a recording of an established collaboration session in which a background is blurred according to individual privacy recording controls, according to one or more example embodiments. The system 200 includes a first client 202*a* (such as the first participant 101*a* joining via the first endpoint device 102*a*) and a second client 202*b* (such as the second participant 101*b* joining via the second endpoint device 102*b*). The system 200 further includes a meeting bridge 210, the recording service 120 of FIG. 1, a policy/rule engine 220, and a recording store 230.

The meeting bridge 210 is executed by one of the collaboration servers 104*a-g* and establishes a collaboration session among the first client 202*a* and the second client 202*b*. The meeting bridge 210 provides a live meeting view 212 to each of the first client 202*a* and the second client 202*b* during the established collaboration session.

The policy/rule engine 220 may be embodied as one or more servers or computing devices. The policy/rule engine 220 is configured to retrieve one or more recording privacy control policy 222 e.g., an enterprise recording privacy control policy for the first client 202*a* and the second client 202*b* and an individual recording privacy control policy for the first client 202*a* and the second client 202*b*. Additionally, the policy/rule engine 220 is configured to listen for an in-band command 224 related to the recordings.

The recording store 230 may be embodied as one or more memories, datastores, and/or databases. The recording store 230 (datastore) stores recordings 232*a-n* generated by the recording service 120. The recording store 230 may store multiple recordings for the same established collaboration session but with different recording privacy controls being applied. For example, a first recording of the established collaboration session may be generated using a first recording privacy control associated with the first participant (no video of the established collaboration session for the participants) and a second recording may be generated using a second recording privacy control associated with the second participant (no audio and content shared by an of the participants is blurred in the recording). In other words, a recorded meeting view 234 may vary from the live meeting view 212 depending on various recording privacy controls.

Specifically, at 240, the meeting bridge 210 obtains audio and video stream from the first client 202*a* and the second client 202*b*. The meeting bridge 210 processes the audio and video obtained at 240 and at 242, provides the first client 202*a* and the second client 202*b* with the live meeting view 212. In the live meeting view 212, the first client 202*a* and the second client 202*b* are shown with their respective physical backgrounds. At 244, the meeting bridge 210 further provides the audio and video stream of the first client 202*a* and the second client 202*b* to the recording service 120 for generating one or more of the recordings 232*a-n*.

The policy/rule engine 220 identifies the first client 202*a* and the second client 202*b* and at 246, obtains their individual recording privacy controls. Specifically, the recording privacy control policy 222 of the second client 202*b* indicates that the background is to be omitted/excluded from the recording. In another example, the policy/rule engine 220 obtains a user action (an in-band command 224) that requests that the physical background of the second client 202*b* is blurred. At 248, the policy/rule engine 220 provides an instruction to the recording service 120. The instruction indicates that the physical background of the second client 202*b* is to be excluded from the recording e.g., blurred or replaced with a virtual one, etc.

The recording service 120 applies one or more privacy controls obtained from the policy/rule engine 220 and generates recordings 232*a-n* that are stored in the recording store 230, at 250. Specifically, the generated recording has the recorded meeting view 234 in which the background of the second client 202*b* is blurred. The recorded meeting view 234 is different from the live meeting view 212 in that the background of the second client 202*b* is blurred. The recording service 120 may further add an indicator 252 that indicates that the recording is different from the established collaboration session. The indicator 252, added to the recording, may further indicate the fidelity level or modality of the recording.

With continued reference to FIGS. 1 and 2, FIG. 3 is a view illustrating a user interface 300 having user recording privacy controls being a user-initiated recording privacy policy limited by a recording privacy policy of an enterprise, according to an example embodiment. The user interface 300 has a plurality of user recording privacy controls 302*a-p*. The user recording privacy controls may include but are not limited to whether to permit video recording, transcripts, gestures, whether to insert video blur background, whether to remove inappropriate language, whether to remove location tags, and whether to insert company or enterprise background.

A user makes a selection of one or more of the user recording privacy controls 302a-p to allow or disallow various data in the recording. For example, the user makes a selection to turn off video recording (a first user recording privacy control), to filter out inappropriate language removal, etc. Some of the user recording privacy controls 302a-p may be disabled based on the enterprise recording privacy controls 310a-q. That is, the user recording privacy controls 302a-p are limited by the enterprise recording privacy controls 310a-q, as shown at 312. For example, the user cannot insert company background, shown at 314. Further, the user recording privacy controls 302a-p may initially be set based on the enterprise recording privacy controls 310a-q. For example, the insertion of video blur background is enabled, shown at 316. When a conflict is detected, a selection of a particular user recording privacy control is disabled (cannot be changed) such as insert the video blur background cannot be changed, shown with red circles around 316.

The user interface 300 is one example of granular level of privacy controls. The user recording privacy controls 302a-p may be checked with enterprise recording privacy controls 310a-q, group recording privacy controls, etc. When conflicts are detected, a selection of a particular user recording privacy control is disabled (cannot be changed).

The granular levels of recording privacy controls (e.g., company (admin) privacy controls and user privacy controls) makes it simple to allow an enterprise-wide recording privacy controls settings, to allow individual users or participants to change the privacy control settings themselves and enable users to easy change the settings (via the meetings permissions user page or via the app itself). The recording service may also add a level of sophistication and ease the level of expertise and input required by a user by, for example, machine learning (ML) enhancements to automatically make selections based on the user's previous preferences or behaviors dictating the level of privacy they intend to set and by personas, specified or learned/determined via machine learning (may include geographical or user sensitivities), can also be used to determine the level of privacy automatically assigned. In other words, the recording service 120 may automatically assign a default fidelity level that is customized to the individual participant using ML and the participant's previous interactions/history of participations and privacy recording settings.

The user interface 300 is an example of setting user recording privacy controls 302a-p after the established collaboration session. The user recording privacy controls 302a-p may also be set before or during the established collaboration session.

Figure 4:
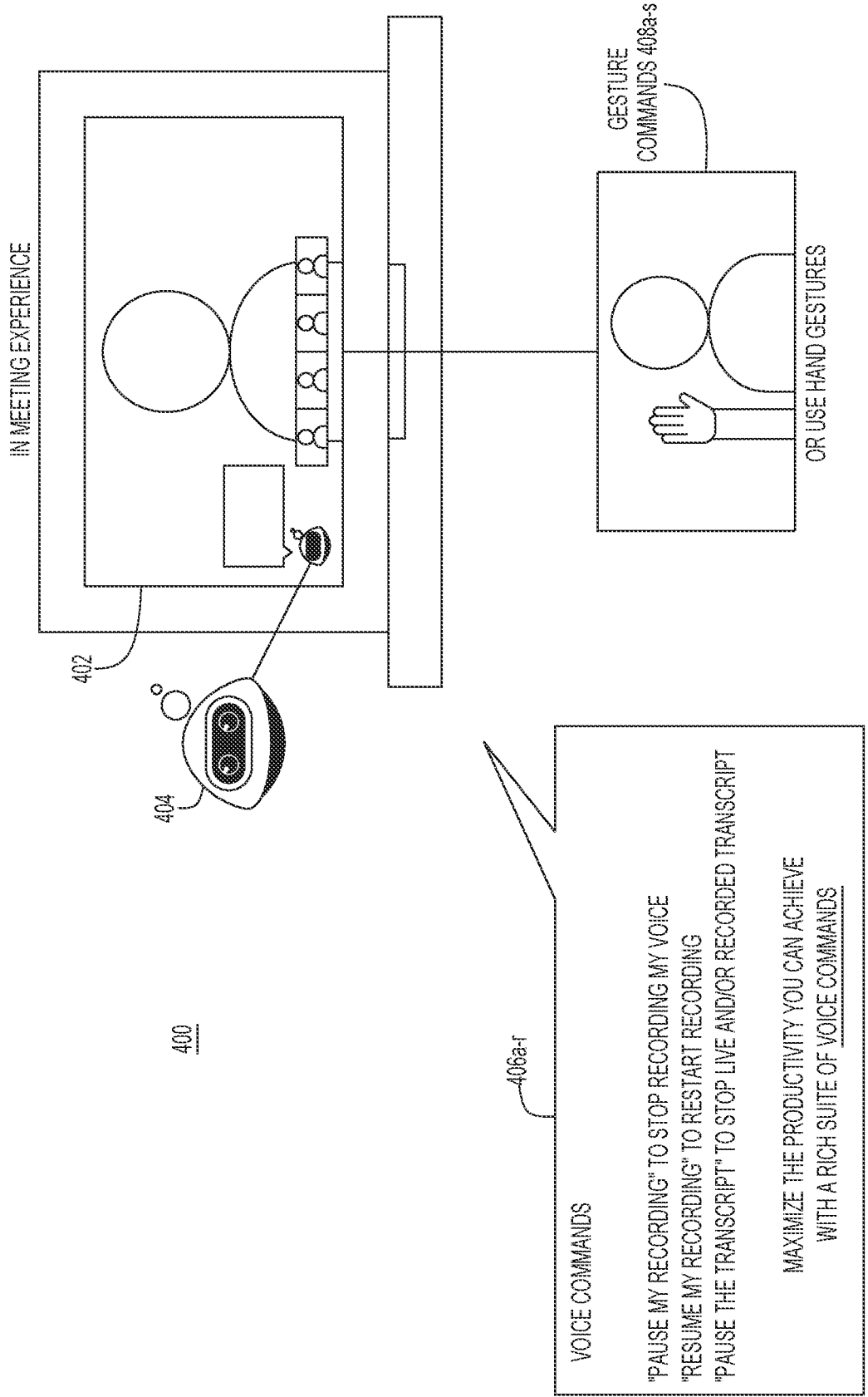
FIG. 4 is a view illustrating a user interface for setting privacy controls during the established collaboration session, according to an example embodiment.

With continued reference to FIGS. 1 and 2, FIG. 4 is a view illustrating a user interface 400 for setting user recording privacy controls during the established collaboration session, according to an example embodiment. The user interface 400 shows an established collaboration session 402. In the established collaboration session 402, an in-meeting assistant 404 is provided to help manage the established collaboration session 402.

The in-meeting assistant 404 is configured to obtain in-band commands for setting one or more recording privacy controls. The in-meeting assistant 404 is configured to detect voice commands 406a-r such as but not limited to "pause my recording", "resume my recording", "pause the transcript". The in-meeting assistant 404 is further configured to detect gesture or sign commands 408a-s. Gesture or sign commands 408a-s may be used but are not limited to analogous functions of voice commands 406a-r.

Figure 5:
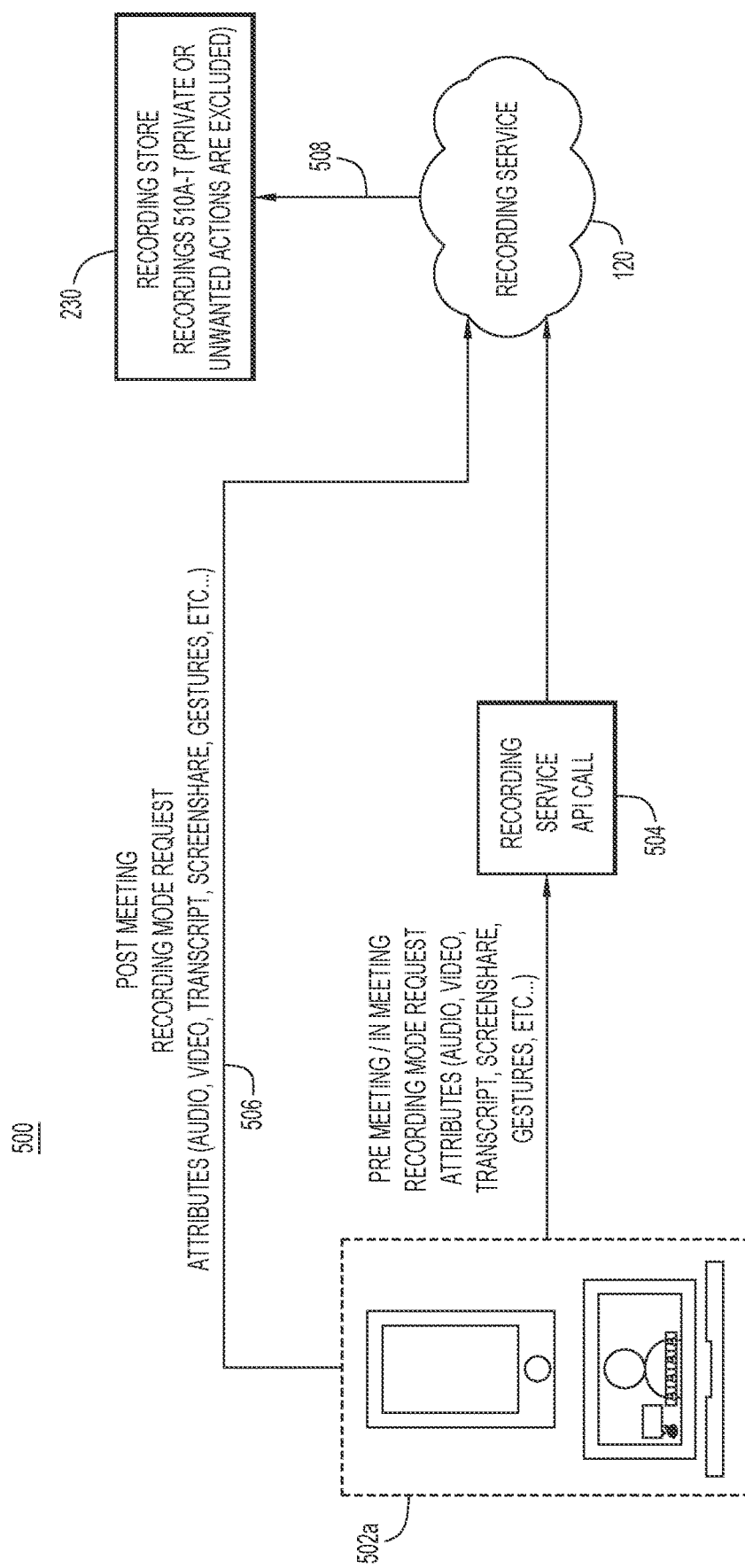
FIG. 5 is a block diagram illustrating a system for generating a recording of an established collaboration session in which occurrences of unwanted or private actions from one or more participants are excluded, according to an example embodiment.

FIG. 5 is a block diagram illustrating a system 500 for generating a recording of an established collaboration session in which occurrences of unwanted or private actions from one or more participants are excluded from the recording, according to an example embodiment. The system includes a first client 502a (such as the first participant 101a joining via the first endpoint device 102a of FIG. 1), the recording service 120 of FIG. 1, and a recording store 230 of FIG. 2.

In the system 500, the first client 502a uses recording service application programming interface (API) calls 504 to request a recording mode during the established collaboration session or before the established collaboration session. The first client 502a may also request a recording mode post meeting (after the established collaboration session has terminated), illustrated at 506.

The recording store 230 stores meeting recordings with metadata tags that include by way of an example and not by way of a limitation an identifier of the participant (the first client 502a). The first client 502a may be identified by a meeting login, voice control, and/or face recognition. The metadata tags may further include mode selected such as one of the fidelity levels or other attributes. In one example, the mode may define attributes such as audio, video, transcript, screenshare, gestures, signs, etc. For example, the mode may specify to remove private or unwanted actions of the first client 502a from the audio, video, transcript, etc. The one or more private or unwanted behaviors may include one or more of an inappropriate gesture, signs made by the participant in the established collaboration session, a facial grimace made by the participant in the established collaboration session, the participant being distracted and looking away from the collaboration session, and/or sneezing, coughing, and scratching by the participant in the established collaboration session. The metadata tags may further include time information such as time for the full collaboration session, or in segments based on in-meeting commands (stop/start, etc.).

The recording service 120 generates recordings 510a-t of the established collaboration session in which the one or more occurrences of the private or unwanted actions defined by one or more modes are excluded from the recording and at 508, stores, in the recording store 230, the recording 510a-t in which the private or unwanted actions are excluded based on the recording mode request or default privacy controls.

For example, the first client 502a may set the mode to exclude or blur facial expressions and grimaces from the video and to exclude tutting, sighs, muttering, anger, banter discussions from the audio. Using this mode, the recording service 120 generates the recording in which these private or unwanted actions are excluded. That is, the recording service 120 recombines the recording of the established collaboration session for playback with relevant artefacts removed.

The recording service 120 obtains individual recording privacy controls that may be in a form of a policy provided before establishing the collaboration session, in a form of in-meeting commands during the established collaboration session, or in a form of post meeting filtering after the collaboration session is terminated. The individual recording privacy controls define each of the private or unwanted actions to exclude from the recording of the established collaboration session and a respective replacement action for the recording of the established collaboration session e.g., change a frown to a smiley face or blur scratching.

The individual recording privacy controls may specify one or more replacement actions such as blurring, excluding, adding a virtual background, or another replacement element, etc. In one example, the replacement action may include excluding the one or more occurrences of the private or unwanted action from the recording of the established collaboration session by blurring a portion of a window of the first client 502a in the established collaboration session when the private or unwanted actions occur.

The recording service 120 may include default setting for removing private or unwanted actions from the recording for all participants of the collaboration session. In other words, even if no recording mode request is received from the first client 502a, the recording service 120 may detect one or more occurrences of a private or unwanted action from the first client 502a in the established collaboration session based on these default settings and generate the recording in which these occurrences of the private or unwanted action is excluded.

For example, the default settings may include detecting private or unwanted behaviors such as an inappropriate gesture made by the participant in the established collaboration session, a facial grimace made by the participant in the established collaboration session, sneezing, coughing, and scratching by the participant in the established collaboration session. The default settings may further include detecting one or more private or unwanted utterances in an audio stream of the first in the established collaboration session such as slurs made by the participant in the established collaboration session and audio utterances indicating anger or discontent made by the participant in the established collaboration session, words indicating confidentiality or that sensitive information is being conveyed in the established collaboration session.

By actively detecting and excluding the occurrences of private or unwanted actions during the collaboration session, the recording service 120 protects users from sharing unwanted personal information and/or behavior.

The techniques explained above provide privacy for meeting recordings by allowing the participants of a collaboration session to control information and behavior that is to be shared without sacrificing the real-life experience of the collaboration session. The privacy for meeting recordings is enhanced by removing or adding certain modalities and experiences before, during, or post the established collaboration session. Based on individual recording privacy controls of various participants of the established collaboration session, each participant individually controls content or information that is to be recorded (video, audio, background, etc.). The generated recording excludes content that is restricted by the individual recording privacy controls. The participants may freely and fully interact during the live collaboration session without the fear of private information or actions becoming part of the recording or permanent record of the collaboration session.

Figure 6:
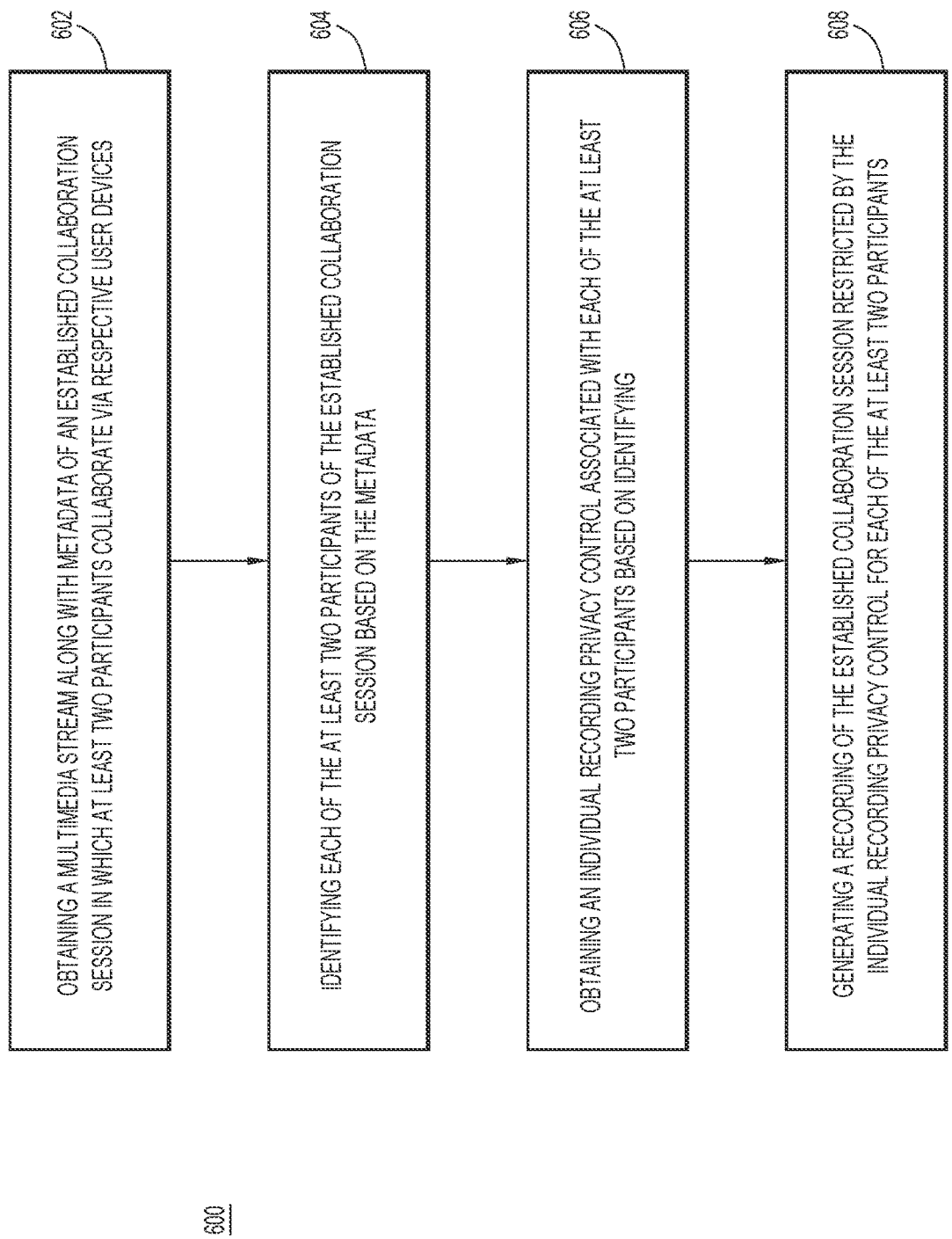
FIG. 6 is a flow diagram illustrating a method of generating a recording of an established collaboration session in which individual recording privacy controls of each participant is applied, according to an example embodiment.

FIG. 6 is a flow diagram illustrating a method 600 of generating a recording of an established collaboration session in which individual recording privacy controls of each participant is applied, according to an example embodiment. The method 600 may be performed by a recording service such as the recording service 120 of FIG. 1, 2, or 5.

The method 600 involves, at 602, a recording service obtaining a multimedia stream along with metadata of an established collaboration session in which at least two participants collaborate via respective user devices.

The method 600 further involves at 604, the recording service identifying each of the at least two participants of the established collaboration session based on the metadata and at 606, obtaining an individual recording privacy control associated with each of the at least two participants based on identifying.

The method 600 further involves at 608, the recording service generating a recording of the established collaboration session restricted by the individual recording privacy control for each of the at least two participants.

In one instance, the at least two participants may include a first participant and a second participant. The operation 608 of generating the recording of the established collaboration session may include applying a first individual recording privacy control associated with the first participant to a first portion of the multimedia stream associated with the first participant and applying a second individual recording privacy control associated with the second participant to a second portion of the multimedia stream associated with the second participant that is different from the first portion of the multimedia stream.

According to one or more example embodiments, the individual recording privacy control may specify a level of fidelity for the recording of a respective participant in the established collaboration session. The level of fidelity for the recording indicates elements specific to the respective participant of the multimedia stream to omit from the recording of the established collaboration session.

In one form, the level of fidelity may be selected from a plurality of fidelity levels that may include at least two of: (1) an incognito fidelity level in which the respective participant is excluded from the recording of the established collaboration session, (2) an attendance fidelity level in which audio, text, video, and participation actions of the respective participant are excluded from the recording of the established collaboration session, (3) a participation fidelity level in which the audio and the video of the respective participant are excluded from the recording of the established collaboration session while the text and the participation actions of the respective participant are included in the recording of the established collaboration session, (4) an audio fidelity level in which the video of the respective participant is excluded from the recording of the established collaboration session while the text, the participation actions, and the audio of the respective participant are included in the recording of the established collaboration session, and (5) a background fidelity level in which a background of the multimedia stream of the respective participant is excluded from the recording of the established collaboration session.

In yet another form, the level of fidelity may be selected from a plurality of fidelity levels that may include: a first fidelity level in which at least an audio and a video of the respective participant are excluded from the recording of the established collaboration session, a second fidelity level in which a video is excluded from the recording of the established collaboration session, and a third fidelity level in which at least a portion of a background in the multimedia stream of the respective participant is excluded from the recording of the established collaboration session.

According to one or more example embodiments, the operation 606 of obtaining the individual recording privacy control associated with each of the at least two participants may include obtaining, from a datastore, a recording privacy control policy associated with each of the at least two participants. The recording privacy control policy may specify a level of fidelity for a respective participant of the at least two participants in the recording of the established collaboration session. The operation 606 of obtaining the individual recording privacy control associated with each of the at least two participants may further include obtaining, during the established collaboration session, at least one instruction or command from the respective participant to exclude at least a portion of an audio stream, a video stream, a participation action, and/or text of the respective participant from the recording of the established collaboration session and/or applying, based on the at least one instruction or command from the respective participant, filtering to the multimedia stream of the established collaboration session after terminating the established collaboration session.

In one instance, the operation of obtaining, from the datastore, the recording privacy control policy associated with each of the at least two participants may include obtaining a recording privacy policy of an enterprise of the respective participant and limiting the recording privacy control policy of the respective participant based on the recording privacy policy of the enterprise.

In another instance, the operation of obtaining, during the established collaboration session, the at least one instruction or command from the respective participant may include obtaining at least one of a voice command, a gesture, and a sign, from the respective participant during the established collaboration session, which control a level of fidelity for the recording of the established collaboration session. The level of fidelity for the recording indicates elements specific to the respective participant of the multimedia stream to omit from the recording of the established collaboration session.

According to one or more example embodiments, the operation 608 of generating the recording of the established collaboration session may include adding, to the recording, an indicator for each of the at least two participants. The indicator may specify the individual recording privacy control of a respective participant of the at least two participants.

In one instance, the at least two participants may include a first participant and a second participant. The method 600 may further involve generating a first recording of the established collaboration session using a first recording privacy control associated with the first participant and generating a second recording of the established collaboration session using a second recording privacy control associated with the second participant.

According to one or more example embodiments, the operation 606 of obtaining the individual recording privacy control associated with each of the at least two participants may include obtaining at least one privacy recording policy of an enterprise specific to a respective participant, obtaining, via a user interface, a selection of one or more user recording privacy controls restricted by the at least one privacy recording policy, and obtaining the individual recording privacy control based on the selection.

Figure 7:
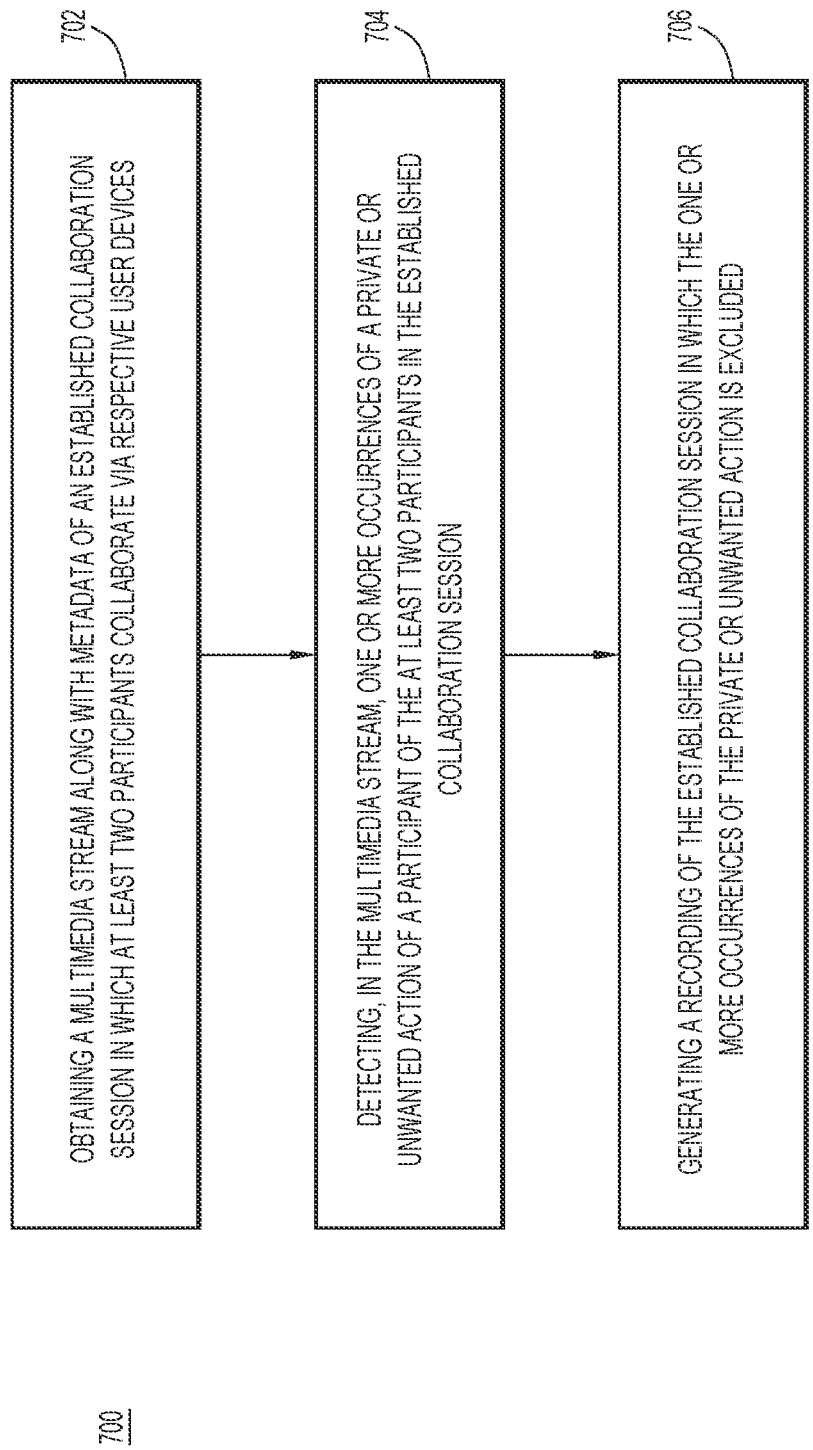
FIG. 7 is a flow diagram illustrating a method of generating a recording of an established collaboration session in which one or more occurrences of a private or unwanted action is excluded, according to an example embodiment.

FIG. 7 is a flow diagram illustrating a method 700 of generating a recording of an established collaboration session in which one or more occurrences of a private or unwanted action is excluded, according to an example embodiment. The method 700 may be performed by a recording service such as the recording service 120 of FIG. 1, 2, or 5.

The method 700 involves, at 702, the recording service obtaining a multimedia stream along with metadata of an established collaboration session in which at least two participants collaborate via respective user devices.

The method 700 further involves at 704, the recording service detecting, in the multimedia stream, one or more occurrences of a private or unwanted action of a participant of the at least two participants in the established collaboration session and at 706, generating a recording of the established collaboration session in which the one or more occurrences of the private or unwanted action is excluded.

In one form, the operation 704 of detecting the one or more occurrences of the private or unwanted action may include detecting one or more private or unwanted behaviors of the participant in the established collaboration session. The one or more private or unwanted behaviors may include one or more of: an inappropriate gesture made by the participant in the established collaboration session, a facial grimace made by the participant in the established collaboration session, and sneezing, coughing, and scratching by the participant in the established collaboration session.

In another form, the operation 704 of detecting the one or more occurrences of the private or unwanted action may include detecting one or more private or unwanted utterances in an audio stream of each of the at least two participants in the established collaboration session. The one or more private or unwanted utterances may include: slurs made by the participant in the established collaboration session, and audio utterances indicating anger or discontent made by the participant in the established collaboration session or indicating confidentiality or that sensitive information is being conveyed in the established collaboration session.

In yet another form, the operation 704 of detecting the one or more occurrences of the private or unwanted action of the participant may include obtaining a recording privacy control policy specific to the participant of the established collaboration session. The recording privacy control policy may define a plurality of private or unwanted actions to exclude from the recording of the established collaboration session and a respective replacement action for the recording of the established collaboration session.

According to one or more example embodiments, the operation 706 of generating the recording of the established collaboration session in which the one or more occurrences of the private or unwanted action is excluded may include excluding the one or more occurrences of the private or unwanted action from the recording of the established collaboration session by blurring a portion of a window of the participant in the established collaboration session when one of the plurality of private or unwanted actions occurs.

Figure 8:
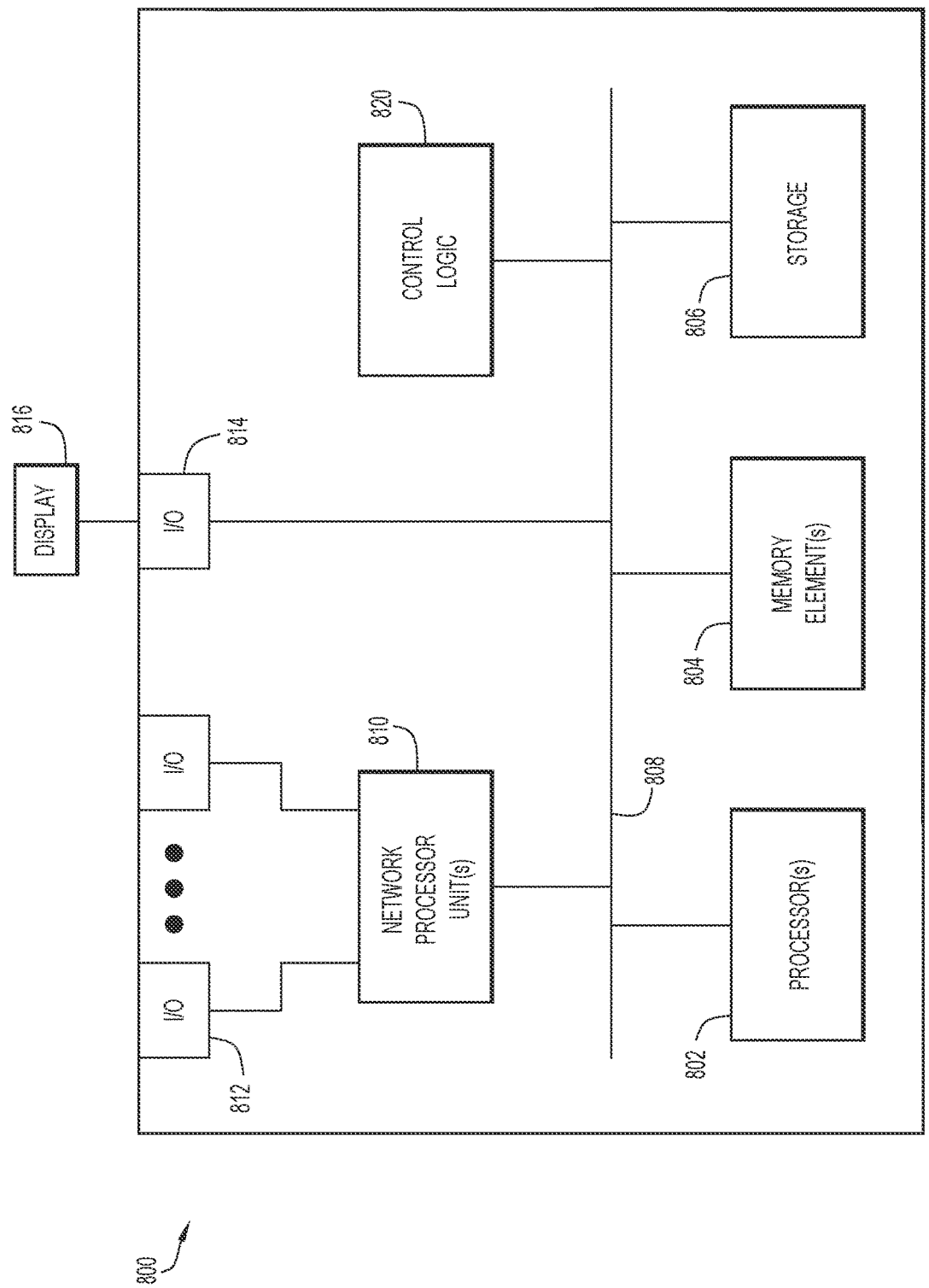
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the one or more user devices 102*a-f*, one or more collaboration servers 104*a-g*, the recording service 120 shown in FIGS. 1, 2, and 5, or a policy/rule engine 220 shown in FIG. 2. It should be appreciated that FIG. 8 provides only an illustration of one example embodiment and does not imply any limitations with respect to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 816, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform operations including obtaining a multimedia stream along with metadata of an established collaboration session in which at least two participants collaborate via respective user devices and identifying each of the at least two participants of the established collaboration session based on the metadata. The operations further include obtaining an individual recording privacy control associated with each of the at least two participants based on identifying and generating a recording of the established collaboration session restricted by the individual recording privacy control for each of the at least two participants.

In yet another example embodiment, the apparatus includes a memory, a network interface configured to enable network communications, and a processor. The processor is configured to perform operations including obtaining a multimedia stream along with metadata of an established collaboration session in which at least two participants collaborate via respective user devices and detecting, in the multimedia stream, one or more occurrences of a private or unwanted action of a participant of the at least two participants in the established collaboration session. The operations further include generating a recording of the established collaboration session in which the one or more occurrences of the private or unwanted action is excluded.

In yet another example embodiment, one or more non-transitory computer readable storage media encoded with instructions are provided. When the media is executed by a processor, the instructions cause the processor to execute a method that includes obtaining a multimedia stream along with metadata of an established collaboration session in which at least two participants collaborate via respective user devices and identifying each of the at least two participants of the established collaboration session based on the metadata. The method further includes obtaining an individual recording privacy control associated with each of the at least two participants based on identifying and generating a recording of the established collaboration session restricted by the individual recording privacy control for each of the at least two participants.

In yet another example embodiment, one or more non-transitory computer readable storage media encoded with instructions are provided. When the media is executed by a processor, the instructions cause the processor to execute a method that includes obtaining a multimedia stream along with metadata of an established collaboration session in which at least two participants collaborate via respective user devices and detecting, in the multimedia stream, one or more occurrences of a private or unwanted action of a participant of the at least two participants in the established collaboration session. The method further includes generating a recording of the established collaboration session in which the one or more occurrences of the private or unwanted action is excluded.

In yet another example embodiment, a system is provided that includes the devices and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a multimedia stream along with metadata of an established collaboration session in which at least two participants collaborate via respective user devices;
   identifying each of the at least two participants of the established collaboration session based on the metadata;
   obtaining an individual recording privacy control associated with a first participant of the at least two participants based on identifying, wherein the individual recording privacy control is specific to recording the established collaboration session and is applied only to a part of the multimedia stream of the first participant in the established collaboration session; and
   generating a recording of the established collaboration session restricted by the individual recording privacy control.

2. The method of claim 1, wherein obtaining the individual recording privacy control includes:
   obtaining, during the established collaboration session, at least one instruction or command from the first participant to exclude, from the recording of the established collaboration session while providing during the established collaboration session, one or more of:
      at least a first portion of an audio stream,
      at least a second portion of a video stream,
      at least one participation action, or
      at least one element of a collaboration session space of the first participant.

3. The method of claim 1, wherein the individual recording privacy control is set by the first participant during the established collaboration session.

4. The method of claim 1, wherein obtaining the individual recording privacy control includes:
   applying, based on at least one instruction or command from the first participant, filtering to the multimedia stream of the established collaboration session after terminating the established collaboration session.

5. The method of claim 1, further comprising:
   terminating the established collaboration session, wherein the individual recording privacy control is obtained after the established collaboration session is terminated.

6. The method of claim 1, wherein the individual recording privacy control for the recording of the established collaboration session does not interfere with a fidelity level for the first participant during the established collaboration session.

7. The method of claim 1, wherein the at least two participants further include a second participant and wherein generating the recording of the established collaboration session includes:
   applying a second individual recording privacy control associated with the second participant to a second portion of the multimedia stream associated with the second participant that is different from the part of the multimedia stream associated with the first participant.

8. The method of claim 1, wherein the individual recording privacy control specifies a fidelity level for the recording of the first participant in the established collaboration session, the fidelity level for the recording indicating one or more elements specific to the first participant of the multimedia stream to omit from the recording of the established collaboration session.

9. The method of claim 8, wherein the fidelity level is selected from a plurality of fidelity levels comprising at least two of:
- an incognito fidelity level in which the first participant is excluded from the recording of the established collaboration session;
- an attendance fidelity level in which audio, text, video, and participation actions of the first participant are excluded from the recording of the established collaboration session;
- a participation fidelity level in which the audio and the video of the first participant are excluded from the recording of the established collaboration session while the text and the participation actions of the first participant are included in the recording of the established collaboration session;
- an audio fidelity level in which the video of the first participant is excluded from the recording of the established collaboration session while the text, the participation actions, and the audio of the first participant are included in the recording of the established collaboration session; and
- a background fidelity level in which a background of the multimedia stream of the first participant is excluded from the recording of the established collaboration session.

10. The method of claim 8, wherein the fidelity level is selected from a plurality of fidelity levels comprising:
- a first fidelity level in which at least an audio and a video of the first participant are excluded from the recording of the established collaboration session;
- a second fidelity level in which the video is excluded from the recording of the established collaboration session while the audio is included in the recording of the established collaboration session; and
- a third fidelity level in which at least a portion of a background in the multimedia stream of the first participant is excluded from the recording of the video of the established collaboration session.

11. The method of claim 1, wherein obtaining the individual recording privacy control includes obtaining the individual recording privacy control associated with each of the at least two participants.

12. The method of claim 11, wherein obtaining the individual recording privacy control associated with each of the at least two participants, includes:
- obtaining a recording privacy policy of an enterprise of a respective participant; and
- limiting the individual recording privacy control of the respective participant based on the recording privacy policy of the enterprise.

13. The method of claim 1, wherein generating the recording of the established collaboration session includes:
- adding, to the recording, an indicator for the first participant, the indicator specifying the individual recording privacy control of the first participant that is applied to generate the recording.

14. The method of claim 1, wherein the individual recording privacy control does not impact the established collaboration session.

15. A method comprising:
- obtaining a multimedia stream along with metadata of an established collaboration session in which at least two participants collaborate via respective user devices;
- identifying each of the at least two participants of the established collaboration session based on the metadata;
- obtaining an individual recording privacy control associated with a first participant of the at least two participants based on identifying, wherein the individual recording privacy control is specific to a part of the multimedia stream associated with the first participant in the established collaboration session; and
- generating a recording of the established collaboration session restricted by the individual recording privacy control, wherein the individual recording privacy control for the recording of the established collaboration session is different from a fidelity level of the first participant in the established collaboration session.

16. The method of claim 15, wherein the individual recording privacy control for the recording of the established collaboration session does not interfere with the fidelity level for the first participant during the established collaboration session.

17. The method of claim 15, wherein the at least two participants further include a second participant, and wherein generating the recording of the established collaboration session includes:
- applying a second individual recording privacy control for recording another part of the multimedia stream of the second participant that is different from the part of the multimedia stream associated with the first participant.

18. A method comprising:
- obtaining a multimedia stream along with metadata of an established collaboration session in which at least two participants collaborate via respective user devices;
- detecting, in the multimedia stream, one or more occurrences of a private or unwanted action of a participant of the at least two participants in the established collaboration session, wherein the private or unwanted action is one of a plurality of actions defined in a recording privacy control that is specific to recording the established collaboration session without impacting the established collaboration session; and
- generating a recording of the established collaboration session in which the one or more occurrences of the private or unwanted action is excluded.

19. The method of claim 18, wherein detecting the one or more occurrences of the private or unwanted action includes:
- detecting one or more private or unwanted behaviors of the participant in the established collaboration session, the one or more private or unwanted behaviors including one or more of:
  - an inappropriate gesture made by the participant in the established collaboration session,
  - a facial grimace made by the participant in the established collaboration session, and
  - sneezing, coughing, and scratching by the participant in the established collaboration session.

20. The method of claim 18, wherein detecting the one or more occurrences of the private or unwanted action includes:

detecting one or more private or unwanted utterances in an audio stream of each of the at least two participants in the established collaboration session, the one or more private or unwanted utterances include:
slurs made by the participant in the established collaboration session, and
audio utterances indicating anger or discontent made by the participant in the established collaboration session or indicating confidentiality or that sensitive information is being conveyed in the established collaboration session.

* * * * *

UNITED STATES PATENT AND TRADEMARK OFFICE
CERTIFICATE OF CORRECTION

PATENT NO. : 12,348,576 B2
APPLICATION NO. : 18/525078
DATED : July 1, 2025
INVENTOR(S) : John Costello et al.

Page 1 of 1

It is certified that error appears in the above-identified patent and that said Letters Patent is hereby corrected as shown below:

In the Claims

Claim 13, Column 23, Line 64 please replace "adding, to the recording," with --adding to the recording,--

Signed and Sealed this
Twenty-sixth Day of August, 2025

Coke Morgan Stewart
*Acting Director of the United States Patent and Trademark Office*